United States Patent
Falkenstein

(10) Patent No.: US 11,959,780 B2
(45) Date of Patent: Apr. 16, 2024

(54) METHOD AND SYSTEM FOR DETERMINING SHIFTS IN POSITION

(71) Applicant: Universitaet Rostock, Rostock (DE)

(72) Inventor: Jens-Werner Falkenstein, Aalen (DE)

(73) Assignee: Universitaet Rostock, Rostock (DE)

( * ) Notice: Subject to any disclaimer, the term of this patent is extended or adjusted under 35 U.S.C. 154(b) by 184 days.

(21) Appl. No.: 17/640,400

(22) PCT Filed: Sep. 3, 2020

(86) PCT No.: PCT/EP2020/074565
§ 371 (c)(1),
(2) Date: Mar. 4, 2022

(87) PCT Pub. No.: WO2021/043886
PCT Pub. Date: Mar. 11, 2021

(65) Prior Publication Data
US 2022/0404176 A1 Dec. 22, 2022

(30) Foreign Application Priority Data
Sep. 6, 2019 (DE) ...................... 10 2019 123 951.6

(51) Int. Cl.
*G01D 5/245* (2006.01)
*G01M 13/04* (2019.01)

(52) U.S. Cl.
CPC .......... *G01D 5/2452* (2013.01); *G01M 13/04* (2013.01); *G01D 2205/90* (2021.05)

(58) Field of Classification Search
CPC ............. G01D 5/2452; G01D 2205/90; G01D 5/24476; G01M 13/04; B60L 3/0038;
(Continued)

(56) References Cited

U.S. PATENT DOCUMENTS

| 10,274,342 B2 | 4/2019 | Chen et al. |
| 2017/0131426 A1* | 5/2017 | Sgarz ..................... G01C 15/02 |

FOREIGN PATENT DOCUMENTS

| DE | 102012215081 A1 | 2/2013 |
| DE | 102015109735 A1 | 12/2016 |

(Continued)

*Primary Examiner* — Farhana A Hoque
(74) *Attorney, Agent, or Firm* — Dickinson Wright PLLC

(57) ABSTRACT

The invention relates to a method for determining shifts in position in at least two different spatial directions between a first element and a second element which are movable relative to each other, with at least two sensors which measure contactlessly and are spaced, in the at least two different spatial directions, from at least two standards which are fixed to the second element, sensor areas of the at least two sensors opposing the at least two standards in the respective spatial direction and sensing said standards, wherein: —the at least two sensors scan the at least two standards and generate, in interaction with the at least two standards, output signals with which in combination an absolute position of the second element is determined, said absolute position being associated with a linear movement in a further spatial direction or with a rotary movement, and—wherein the output signals of the at least two sensors are also used to determine values which characterise the distance between the respective sensor and the corresponding standard of the second element in the associated spatial direction, are corrected as a function of the determined absolute position of the second element, and from which the shift in position of the second element relative to the first element in the respective spatial direction is determined.

20 Claims, 3 Drawing Sheets

(58) Field of Classification Search
CPC ...... F16C 19/26; F16C 2370/00; F16C 19/52; F16H 55/24
See application file for complete search history.

(56) References Cited

FOREIGN PATENT DOCUMENTS

| | | |
|---|---|---|
| DE | 112015005624 T5 | 9/2017 |
| DE | 102016116113 A1 | 3/2018 |
| DE | 102016226293 A1 | 7/2018 |
| EP | 1526362 A1 | 4/2005 |

* cited by examiner

METHOD AND SYSTEM FOR DETERMINING SHIFTS IN POSITION

The invention relates to a method for determining shifts in position in at least two different spatial directions between a first element and a second element, which are movable relative to one another.

The invention also relates to a system for determining shifts in position in at least two different spatial directions between a first element and a second element, which are movable relative to one another.

In drive systems, in particular in the field of vehicle technology and general drive technology, measuring or determining torques and forces is necessary, in particular in conjunction with functional safety. New ISO standard 26262 describes the requirements for electrical/electronic/programmable electronic systems in motor vehicles. With increasing electrification and the use of drive-by-wire technology, the risk increases that errors in the control will result in undesired implementation of variables, in particular torques, in the drive system. This can result in severe consequences. This also applies accordingly, of course, to faults in the wiring or in the power electronics.

The incorrect implementation of a variable in the drive train has to be recognized quickly and reliably. A safety-related control has to take countermeasures to ensure the controllability of the motor vehicle for the driver.

Mechanical forces or torques are usually not measured directly for reasons of cost. The limited robustness of corresponding measuring systems in relation to the operating conditions in the motor vehicle with soiling, vibrations, and large temperature range and the limited lifetime of these measuring systems also speak against the use thereof. Such measurements are also required in the context of condition monitoring for, for example, industrial or ship transmissions.

DE 10 2016 116 113 A1 discloses a bearing and a method for wear monitoring and/or load measurement. A bearing is proposed, in particular a roller bearing, having a fixed first bearing ring and a second bearing ring arranged rotatably relative to the first bearing ring around a longitudinal axis, wherein the bearing has at least one first sensor and one second sensor. By using two different measuring sensors, a radial relative displacement of the bearing rings can be unambiguously distinguished from an axial relative displacement. Loads acting on the bearing can thus also be detected in the same way separately according to axially and radially acting forces.

A load determination system for a roller bearing is specified in DE 11 2015 005 624 T5. The bearing comprises a first ring and a second ring as an inner ring and an outer ring, wherein either the first or second ring can be the inner ring, wherein the other ring is the outer ring. The system comprises at least two magnetic sensors, which are attached to the first ring in order to interact with a target ring which is attached to the second ring. Furthermore, the system comprises a signal processing unit which is designed to receive the magnetic sensor output of the at least one magnetic sensor, wherein the signal processing unit is designed to determine at least axial forces, which act on the bearing, based on the amplitude of the magnetic sensor output. Furthermore, it is proposed that the signal processing unit is designed to calculate a mean value of the outputs of the at least two magnetic sensors and to calculate a logarithm of a ratio of the mean values in order to determine a load which acts on the bearing. Furthermore, performing averaging of the amplitude over a revolution is intended. This is also to compensate for an imbalance and fastening inaccuracies of the magnetic ring.

One error pattern in electric vehicles is, however, a vehicle movement not intended by the driver, in particular in an initially stationary vehicle. This can arise as a result of an undesired torque, for example, in the case of a fault in a drive assembly. An undesired torque has to be recognized promptly and suppressed by the algorithms of functional safety. Averaging over a revolution according to DE 11 2015 005 624 would take too long in conjunction with an excessively large vehicle movement.

Measuring systems are known from the prior art which generate an absolute signal, for example, for a torsion angle or a position. Multiple tracks are applied to a target ring or a linear scale, which are arranged adjacent to one another. An air gap between sensor and target ring or linear scale has the same orientation for all tracks. The absolute signal is generated by means of multitrack binary pattern, multitrack gray pattern, pseudorandom code, in particular with an additional incremental track for fine interpolation or a Nonius track (two tracks having different numbers of poles).

Proceeding therefrom, the present invention is based on the object of creating a method for determining shifts in position of the type mentioned at the outset, which avoids the disadvantages of the prior art, in particular corrects geometrical and magnetic inaccuracies of the sensors used and the associated reference surfaces and/or enables an ascertainment of reliable measured values of the torque and/or the force in a drive system already at a standstill or after slight movement.

This object is achieved according to the invention by a method having the features mentioned in claim 1.

According to the invention, a method is proposed for determining shifts in position in at least two different spatial directions between a first element and a second element, which are movable relative to one another, having at least two contactlessly measuring sensors, which are arranged spaced apart in the at least two different spatial directions from at least two standards fixedly connected to the second element, wherein sensor surfaces of the at least two sensors are opposite to the at least two standards in the respective spatial direction and register them, wherein:

the at least two sensors scan the at least two standards and generate output signals in interaction with the at least two standards, using which in combination an absolute position of the second element is determined, which is connected to a linear movement in a further spatial direction or to a rotational movement, and wherein furthermore by means of the output signals of the at least two sensors, values are determined which characterize the distance between the respective sensor and the corresponding standard of the second element in the associated spatial direction, which are corrected as a function of the ascertained absolute position of the second element, and from which the shift in position of the second element relative to the first element in the respective spatial direction is determined.

By way of the determination according to the invention of shifts in position in at least two different spatial directions or in a first and in a second spatial direction between a first element and a second element, which are movable relative to one another, in particular in consideration of elasticities, in particular material elasticities, torques and/or forces between the two elements can be concluded. Furthermore, an absolute position of the second element is determined, which is linked to a linear movement in a further spatial direction or to a rotational movement. According to the invention, the shift in position in the respective spatial direction is ascertained from values which characterize the distance between the respective sensors and the corresponding standard in the associated spatial direction. These values are very advantageously corrected by the ascertained absolute position or the ascertained absolute rotational angle, in order to eliminate inaccuracies, in particular manufacturing inaccuracies or as a result of thermal expansions, alignment problems of the standards, or sensor or encoder errors.

The values characterizing the distance between the respective sensor and the corresponding standard of the second element in the associated spatial direction can be determined by an amplitude of the output signal of the respective sensor. The distance or the respective thickness of the air gap can be determined by the amplitude of the sensor signals. If a magnetic field is scanned using the sensors, for example, the feedback thus changes as a function of the distance between sensor and standard or sensor ring. A determination of the shifts in position can thus also be carried out with means already provided in any case for determining the absolute position of the second element.

The at least two standards can be designed in such a way that in combination with one another, they form means for determining the absolute position of the second element.

The at least two standards can in combination with one another form a binary pattern, a gray pattern, a pseudorandom code, in particular having an additional incremental track for fine interpolation, or a Nonius track.

An absolute signal can thus be generated, in particular for a torsion angle or a position. Multiple tracks are applied, for example, to a target ring or a linear scale as the standard, which are arranged close to one another. An air gap between sensor and standard or target ring or linear scale can have a different orientation for at least two tracks, wherein the sensor surfaces can be opposite to the tracks in different spatial directions. The absolute signal can be generated by means of a multitrack binary pattern, a multitrack gray pattern, a pseudorandom code, in particular having additional incremental track, or a Nonius track, i.e., having two tracks having different numbers of poles.

The at least two sensors can be connected to the first element and/or to a fixed structure.

Forces and/or torques which act between the first element and the second element can be determined from the ascertained shifts in position of the second element relative to the first element.

Redundant values of torques, the effects of which induce the shifts in position, for example, due to tooth or traction mechanism forces or further external forces which act on the second element, can be ascertained in each case from the ascertained shifts in position of the second element relative to the first element in the at least two spatial directions. The forces and/or torques can be determined in particular by means of corresponding models. Alternatively or additionally, if the at least two different spatial directions are used as different calculation paths, they can be checked for plausibility with one another to obtain at least two redundant channels, preferably for error detection in the event of an excessively large deviation of the redundant values. Corresponding models can again be used to determine the torque values in this case too. Alternatively or additionally, the at least two different calculation paths can be used to determine, by means of a comparison of the calculated values, the further external forces which act on the second element and induce additional shifts in position. Corresponding models can also be used to determine the torque values and the further external forces.

In addition, a resulting torque can be formed, in particular by preferably weighted averaging, from the redundantly ascertained torque values. A more accurate determination of the torque is thus enabled.

The method according to the invention can be used in a bearing, in particular a roller bearing, wherein a preferably fixed first bearing ring of the bearing is used as the first element and a second bearing ring of the bearing rotatably arranged around a longitudinal axis relative to the first bearing ring is used as the second element.

At least two sensors can be connected to a first ring of a bearing or housed thereon, wherein at least two standards or target rings are connected to a second ring of the bearing. The at least two sensors can also be connected to a housing or a structure which accommodates the first ring of the bearing, wherein the target rings or standards are connected to a shaft which accommodates the second ring of the bearing. An arrangement of the at least two standards and the at least two sensors outside an oil-conducting housing can be useful, for example, in gearwheel transmissions, in order to prevent interference with optical sensors by the oil or with magnetic sensors due to magnetic or ferromagnetic abraded material in the oil.

An absolute torsion angle of the second bearing ring can be used as the ascertained absolute position of the second element.

A radial direction can be used as a first spatial direction and an axial direction in relation to the longitudinal axis of the second bearing ring can be used as a second spatial direction.

A current operating bearing play and/or mass forces as a result of accelerations can be taken into consideration in the determination of the forces which act between the first bearing ring and the second bearing ring and/or the torques, the effects of which induce the forces.

The ascertainment of forces or torques acting between the two bearing rings from the relative shifts or tilts of the bearing rings can require the knowledge of the operating bearing play. This is dependent on the bearing clearance class (nominal bearing clearance) of the bearing, the fits on the bearing seats for the bearing rings, and wear and thermal expansions. The nominal bearing clearance and the fits vary from specimen to specimen, but change only slowly or not at all over time, for example, due to running in or occurrences of settling. The wear also only changes slowly over time. It is proposed that the current operating bearing play and the geometrical center position of the bearing be detected upon a zero crossing (=sign change) of the bearing load. The values thus ascertained can be corrected based on a measured current bearing temperature, which can also change quickly. The current operating bearing play may thus be registered well, even if a zero crossing of the bearing load has already taken place a long time ago and at a different bearing temperature. The mass forces as a result of accelerations can be, for example, housing movements as a result of driving shocks (for example due to potholes), which can be measured and corrected or at which the relevant frequency range can be filtered out.

It is advantageous if a first value of a torque, which acts on the bearing, is formed from an axial bearing force and a second value of the torque is formed from a radial bearing force. The axial bearing force and the radial bearing force can be absorbed by the bearing and induced by the torque. The axial bearing force can be formed essentially or completely on the basis of a bearing model from a value characterizing the distance between the sensor and the corresponding standard of the second bearing ring in the axial spatial direction. The radial bearing force can analogously be formed essentially or completely on the basis of a bearing model from a value characterizing the distance between the sensor and the corresponding standard of the second bearing ring in the radial spatial direction.

Gearwheel transmissions are usually embodied having helical gear teeth. As a result of a drive torque and the effect of the helical gear teeth, an axial force and a radial force therefore arise, which are absorbed by the bearing and result in a relative displacement of the two bearing rings in relation to one another in the axial and radial directions. It can be provided according to the invention that the drive torque is determined from the axial force, which can predominantly be ascertained from the axial displacement. In addition, the drive torque can be determined from the radial force, which can predominantly be ascertained from the radial displacement. Two redundant channels for ascertaining the drive torque are therefore available, which should supply at least approximately the same value for the ascertained drive torque in the error-free case.

In particular for error detection, a deviation between the first and the second torque value can be determined. An error can be recognized if the deviation between the first and the second torque is above a predefined threshold value, preferably dependent on the operating state.

In the event of an excessively large deviation (greater than a threshold dependent on the operating state), an error in the sensor system, the evaluation, or the bearing can be concluded, and possibly a shutdown of the drive system or operation at reduced drive power or reduced drive torque can be initiated.

The method according to the invention can be used in a vehicle, in particular having an electrified drive arrangement, wherein the bearing is part of the drive arrangement and a transmission shaft of the drive arrangement accommodates the second bearing ring, and wherein a resulting drive torque is determined by weighted averaging, in particular dependent on the operating state, of the first and second torque.

At least one of the sensors can be embodied as a magnetic sensor. Furthermore, optical sensors can also be used, in which the respective thickness of the air gap can be determined by the amplitude of the sensor signals, a runtime of a light beam, a phase position of a reflected light beam, and/or by means of triangulation.

At least one of the standards can be designed as a multipolar magnetic ring, which circumferentially has alternating magnetic regions. A ferromagnetic standard having teeth or slots can also be used. If optical sensors are provided, which operate, for example, according to the reflected or transmitted light principle, the standards can alternately have optically reflective or transmissive and nonreflective or opaque regions.

In claim 21, a system is specified for determining shifts in position in at least two different spatial directions between a first element and a second element, which are movable relative to one another.

With the aid of the invention, it is possible to ascertain a torque or a force on a drive system, wherein a reliable measured value is already supplied at a standstill or after slight movement (significantly less than one revolution, for example, of the electric motor). The ascertainment can be embodied redundantly (two-channel), in order to enable an error diagnosis by the comparison of two measured values. The method is implementable cost-effectively and replaces encoder systems already provided in the drive system. In addition, a check of the bearings for correct function and a wear measurement of the bearing are possible.

Advantageous embodiments and refinements of the invention result from the dependent claims. An exemplary embodiment of the invention is described in principle hereinafter on the basis of the drawing.

The at least two magnetic sensors can be housed in a housing which additionally contains a computing unit or an electronic control unit, which processes the magnetic sensor signals in accordance with the method or algorithm according to the invention and can provide at least the absolute torsion angle of the bearing, the relative shift, which is corrected of inaccuracies, of the two bearing rings to one another in the axial and radial directions, the current bearing play, and an error signal via a digital interface. In one embodiment, the housing can additionally have a temperature detection for ascertaining the current operating bearing play.

In one refinement of the invention, the ascertained absolute torsion angle of the bearing can be used as a rotor position signal for an electrical machine. A further rotor position encoder is thus dispensed with or a redundancy to an already provided rotor position encoder is provided in the context of functional safety.

In the Figures.

In the figures, functionally identical elements are provided with the same reference signs.

A method is proposed for determining shifts in position in at least two different spatial directions between a first element and a second element, which are movable relative to one another, having at least two contactlessly measuring sensors, which are arranged spaced apart in the at least two different spatial directions from at least two standards fixedly connected to the second element, wherein sensor surfaces of the at least two sensors are opposite to the at least two standards in the respective spatial direction and register them, wherein:

the at least two sensors scan the at least two standards and generate output signals in interaction with the at least two standards, using which in combination an absolute position of the second element is determined, which is linked to a linear movement in a further spatial direction or to a rotational movement, and wherein furthermore values are determined by means of the output signals of the at least two sensors, which characterize the distance between the respective sensor and the corresponding standard of the second element in the associated spatial direction, which are corrected as a function of the ascertained absolute position of the second element, and from which the shift in position of the second element relative to the first element in the respective spatial direction is determined.

The values characterizing the distance between the respective sensor and the corresponding standard of the second element in the associated spatial direction can be determined by an amplitude of the output signal of the respective sensor.

The two standards can be designed in such a way that in combination with one another, they form means for determining the absolute position of the second element.

At least two standards can in combination with one another form a binary pattern, a gray pattern, a pseudorandom code, in particular having an additional incremental track for fine interpolation, or a Nonius track.

The at least two sensors can be connected to the first element and/or to a fixed structure.

Forces and/or torques which act between the first element and the second element can be determined from the ascertained shifts in position of the second element relative to the first element.

Redundant values of torques, the effects of which induce the shifts in position, or further external forces, which act on the second element, can each be ascertained from the ascertained shifts in positions of the second element relative to the first element in the at least two different spatial directions.

A resulting torque can be formed, in particular by a preferably weighted averaging, from the redundantly ascertained torque values.

Figure 1:
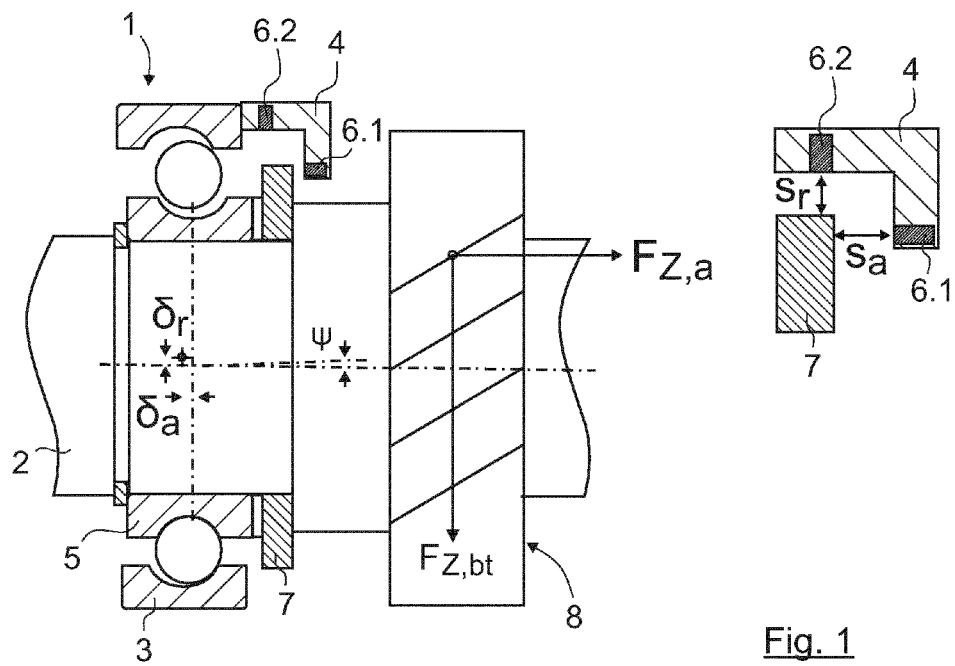
FIG. 1 shows a schematic detail illustration of a transmission shaft, which is mounted in a bearing arrangement to illustrate the method according to the invention.

In the present exemplary embodiment, the method according to the invention is used in a bearing, in particular in a roller bearing 1 (see FIG. 1). FIG. 1 shows a detail of a transmission shaft 2, which is mounted using roller bearings 1 in a fixed-floating bearing arrangement. FIG. 1 shows as the roller bearing 1 a fixed bearing or deep groove ball bearing. The first element is embodied as a preferably fixed first bearing ring 3 of the roller bearing 1. The first bearing ring 3 is connected as the outer bearing ring to a sensor housing 4 and a fixed structure (not shown). A second bearing ring 5 of the roller bearing 1 arranged rotatably around a longitudinal axis relative to the first bearing ring 3 is provided as the second element. As is apparent from FIG. 1, the sensor housing 4 is fastened on the first bearing ring 3, which has two contactless sensors embodied as magnetic sensors 6.1 and 6.2. The magnetic sensor 6.1 is arranged in the axial direction (axial sensor), the magnetic sensor 6.2 is arranged in the radial direction (radial sensor). A pole ring 7 is arranged on the second bearing ring 5 or bearing inner ring, which is provided circumferentially with alternating magnetic regions, i.e., with accurately manufactured, equidistant magnetic north and south poles, and forms a multipolar magnetic ring as standards. One north pole and one adjoining south pole are referred to as a pole pair. Circumferential pole pairs are applied to the end face facing in the axial direction (axial pole pairs) and circumferential pole pairs are applied to the cylinder face facing in the radial direction (radial pole pairs). The pole ring 7 thus unifies the above-described two target rings or standards. The two standards or target rings form in conjunction with one another a means for determining the absolute position of the second element formed as the second bearing ring 5, in particular a Nonius track. For this purpose, for example, one more radial pole pair is applied circumferentially than axial pole pairs are present. During the rotation of the transmission shaft 2, the radially attached magnetic sensor 6.2 supplies a sine-like signal, which contains one more period per revolution than the sine-like signal of the axial magnetic sensor 6.1. By evaluating the phase shift between the two signals (Nonius evaluation), the absolute torsion angle φ of the transmission shaft 2 is determined. With initially stationary transmission shaft 2, this only requires a minor pivot, due to which the absolute torsion angle φ of the transmission shaft 2 is known with high reliability shortly after the beginning of rotation. The absolute torsion angle φ of the second bearing ring 5, which is arranged on the transmission shaft 2, is used as the ascertained absolute position of the second element. A radial direction is used as a first spatial direction and an axial direction in relation to the longitudinal axis (center axis) of the second bearing ring 5 is used as a second spatial direction.

The rotational direction can be recognized, for example, by means of multiple sensor elements per magnetic sensor 6.1, 6.2, which are arranged offset in the circumferential direction. Preferably, the rotational direction of each of the two magnetic sensors 6.1, 6.2 is ascertained. A comparison of the two results is used for error recognition. The speed of the transmission shaft 2 is also ascertained by each of the two sensors, wherein a comparison of the two results is also used for error recognition. A raw value $s_{a,raw}$ for the dimension of an axial air gap $s_a$ between the axial pole pairs of the pole ring 7 and the axial magnetic sensor 6.1 is recognized on the basis of the amplitude of the signal of the axial magnetic sensor 6.1. A raw value $s_{r,raw}$ for a dimension of the radial air gap $s_r$ between the radial pole pairs of the pole ring 7 and the radial magnetic sensor 6.2 is recognized on the basis of the amplitude of the signal of the radial magnetic sensor 6.2. As the air gap $s_a$, $s_r$ becomes larger, the amplitudes decrease. The values characterizing the distance or air gap $s_a$, $s_r$ between the respective magnetic sensor 6.1, 6.2 and the corresponding standard of the pole ring 7 in the associated spatial direction can thus be determined by the amplitude of the output signal of the respective magnetic sensor 6.1, 6.2. An evaluation unit (not shown), which is embodied in particular as multichannel, is integrated in the sensor housing 4, which can output redundant error signals. The evaluation unit is connected for communication as an electronic control unit to the at least two magnetic sensors 6.1, 6.2 and receives their output signals as input signals. The evaluation unit is configured to execute the method according to the invention.

The sine-like sensor signals can also be influenced by the frequency (amplitude response) and the temperature. A correction of the amplitudes can therefore be provided based on the current speed (which specifies the frequency) and a measured current temperature. A temperature detection or a temperature sensor 12 (see FIG. 4) can be integrated in the sensor housing 4 for this purpose and taken into consideration by the evaluation unit.

The pole ring 7 and the further parts can have geometrical and magnetic inaccuracies distributed around the circumference. These have an effect on the raw values $s_{a,raw}$ and $s_{r,raw}$ of the axial air gap $s_a$ and the radial air gap $s_r$. According to the invention, the ascertained absolute torsion angle φ is used for an adaptation or correction. In the following exemplary embodiment, a sinusoidal correction of the raw values is carried out for this purpose:

$$s_a = s_{a,raw} + A_a \sin(\varphi - \varphi_a) \qquad (1)$$

$$s_r = s_{r,raw} + A_r \sin(\varphi - \varphi_r) \qquad (2)$$

The parameters axial adaptation $A_a$, axial absolute torsion angle $\varphi_a$, radial adaptation $A_r$, and radial absolute torsion angle $\varphi_r$ are optimized in an operating state having constant bearing load in such a way that the corrected air gaps $s_a$, $s_r$ change as little as possible over a revolution. An operating state having constant bearing load is detected in that the raw value $s_{a,raw}$ of the axial air gap $s_a$ is scanned over one or more revolutions at the same absolute torsion angle (Neat and the deviation in absolute value of the individual values is within a predefined low threshold. In a state having constant bearing load, the raw value $s_{r,raw}$ of the radial air gap $s_r$ is also scanned over one or more revolutions at the same absolute torsion angle $\varphi_{Test}$ and the deviation in absolute value of the individual values has to be within a predefined low threshold. The raw values $s_{a,raw}$, $s_{r,raw}$ can also be scanned at multiple different absolute torsion angles $\varphi_{Test1} \ldots \varphi_{Testx}$, wherein for each of the absolute torsion angles, the deviation in absolute value of the individual values is considered separately. In one expansion, the parameters $A_a$, $\varphi_a$, $A_r$, $\varphi_r$ can be changed depending on speed and/or depending on temperature, for example, to also correct effects of an imbalance and/or an asymmetrical thermal expansion. The approach of a sinusoidal correction of the raw values is to be viewed solely as an example. Alternatively, it is conceivable to determine a correction value for each of the pole pairs in an operating state having constant bearing load and store them in a table of the evaluation unit. With the absolute torsion angle $\varphi$ of the transmission shaft 2 or the second bearing ring 5, the corrected air gaps $s_a$, $s_r$ are also known with high reliability after a minor rotation of the initially stationary transmission shaft 2. At higher speeds, in contrast, structural vibrations of the transmission can influence the sine-like sensor signals and thus the corrected air gaps $s_a$, $s_r$. In this case, low-pass filtering of the corrected air gaps $s_a$, $s_r$ can be used, which eliminates the higher frequencies of the structural vibrations from the signals. Adaptive filters which remove a certain frequency, for example, a speed-dependent tooth engagement frequency, from the corrected air gaps $s_a$, $s_r$, are also possible. The corrected air gaps $s_a$, $s_r$ may moreover be used for a roller bearing or transmission diagnosis in that repeating disturbances are ascertained from the time curves in conjunction with the registered speed and the absolute torsion angle $\varphi$. Together with the cycling frequencies, these permit damage to a runway, to roller bodies, or to the tooth of a gearwheel to be concluded.

The axial air gap $s_a$ changes as a result of an axial shift $\delta_a$ (see FIG. 1) of the bearing in the event of an axial force and due to a tilt $\psi$ of the roller bearing 1, for example, because of a shaft deflection. In the general case, it can be provided that the axial magnetic sensor 6.1 is positioned so that in the event of a load of the bearing, the effects of the axial shift $\delta_a$ and the tilt $\psi$ on the axial air gap $s_a$ add up, to thus obtain the largest possible change of the axial air gap $s_a$ upon load. In the exemplary embodiment, a short transmission shaft 2 having minor shaft deflection is presumed for the sake of simplicity. The tilt $\psi$ is therefore neglected. The radial air gap $s_r$ changes as a result of a radial shift $\delta_r$ of the roller bearing 1 (see FIG. 1) in the event of a radial force. It is proposed that the radial magnetic sensor 6.2 be positioned in the force direction of the radial force arising upon a load of the bearing so that the load of the bearing has the strongest possible effect on a change of the radial air gap $s_r$.

Figure 2A:
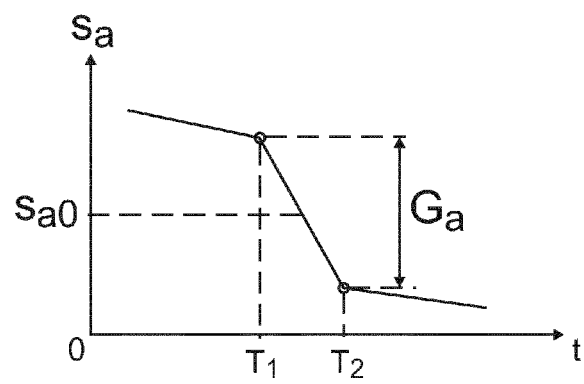
FIG. 2a shows a simplified diagram of a time curve of an axial air gap.
Figure 2B:
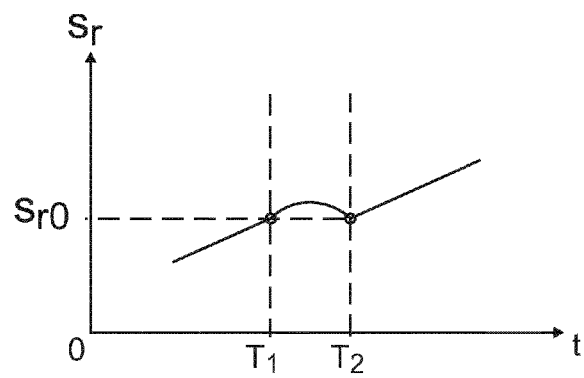
FIG. 2b shows a simplified diagram of a time curve of a radial air gap.

The operating bearing play is dependent on the bearing clearance class (nominal bearing clearance) of the roller bearing 1, the fits on the bearing seats for the bearing rings 3, 5, and wear and thermal expansions. It is proposed that the current axial operating bearing play and the geometrical axial center position of the roller bearing 1 be detected upon a zero crossing (i.e., upon a sign change) of the axial bearing load. FIG. 2*a* shows by way of example a time curve of the axial air gap $s_a$. In the first range between zero and the point in time $T_1$, the axial air gap $s_a$ only changes with a minor gradient over the time t. The roller bearing 1 stands under axial load, changes of this axial load act via the elasticities on the axial air gap $s_a$. In the middle range between the two points in time $T_1$ and $T_2$, the sign of the axial bearing load changes. A total axial play $G_a$ is passed through, which characterizes the overall displaceability of the bearing inner ring or the second bearing ring 5 in relation to the bearing outer ring or first bearing ring 3 from one contact point to the other as a result of the bearing clearance. This takes place with a relatively large gradient. This changed gradient can advantageously be used to detect the passage of axial play $G_a$. After the passage, from the point in time $T_2$, the axial air gap $s_a$ again only changes with minor gradients. In the middle of the axial play $G_a$, the geometrical axial center position of the roller bearing 1 is present. The associated center position $s_{a0}$ of the axial air gap $s_a$ can be calculated therefrom, which characterizes the geometrical center position of the roller bearing 1 in the axial direction. In the present exemplary embodiment, the transmission shaft 2 considered carries a helical toothed gearwheel 8, which generates the significant bearing load. A tooth normal force is identified in FIG. 1 with $F_{Z,bt}$ and a tooth axial force with $F_{Z,a}$. Upon the passage of the axial play $G_a$, i.e., upon the sign change of the axial bearing load, a radial bearing load close to zero is therefore also to be presumed. In this state, shaft deflections and the tilt $\psi$ of the roller bearing 1 resulting therefrom are also minor and thus negligible. At the points in time $T_1$ and $T_2$, the roller bearing 1 is located nearly unloaded in its axial end positions and thus simultaneously in the radial center position due to the geometry of the deep groove ball bearing. From the values of the radial air gap $s_r$ present at the points in time $T_1$ and $T_2$, the center position $s_{r0}$ of the radial air gap $s_r$ can now be calculated, for example, by averaging of the two values. The center position $s_{r0}$ of the radial air gap $s_r$ characterizes the geometrical center position of the roller bearing 1 in the radial direction (see FIG. 2*b*). FIG. 2*b* shows by way of example a time curve of the radial air gap $s_r$.

At constant bearing temperature, the axial play $G_a$ only changes slowly over time, for example, due to running in, occurrences of settling, or wear. In contrast, the bearing temperature can change quickly. The ascertained values of the axial play $G_a$ and the center positions $s_{a0}$, $s_{r0}$ are corrected based on the bearing temperature $\theta_0$ prevailing at the point in time of the ascertainment and the measured current bearing temperature $\theta$. The current axial play $G_a$ and the current center positions $s_{a0}$, $s_{r0}$ may thus be registered well, even if they were ascertained at a different bearing temperature $\theta_0$. That is to say, when a zero crossing of the bearing load already occurred a long time ago and at a different bearing temperature. In many applications, the operating bearing play is passed through at a zero crossing (i.e., at a sign change) of the drive torque or the drive force. It is therefore proposed that the above-described detection be checked for plausibility on the basis of an estimated or observed drive torque, for example, on the basis of measured currents of an electrical machine. The radial play $G_r$ of the bearing or roller bearing 1 is calculated based on the ascertained axial play $G_a$ and the bearing geometry. A check or fine adaptation of the radial play $G_r$ and the axial play $G_a$ can be carried out on the basis of an estimated or observed drive torque and on the basis of the ascertained axial air gap $s_a$ and the radial air gap $s_r$. In the event of an excessively strong deviation of the axial play $G_a$ and/or the radial play $G_r$ from temperature-dependent predefined values, a mechanical fault or excessively high bearing wear can be concluded and an error signal can be generated. For example, it is proposed for electric vehicles that the electrical machine be activated with stationary vehicle and actuated brake alternately with a low positive and a low negative drive torque. The level of the drive torque is established on the basis of the current brake pressure, so that the drive torque does not overcome the brake torque and no vehicle movement takes place. A zero crossing of the drive torque results. With helical gear teeth, the axial play $G_a$ of the observed bearing is passed through and detected. Looseness and elasticity are typically present in the drivetrain, so that the observed transmission shaft 2 slightly twists cyclically due to the alternating drive torque and the dimension of the axial air gap $s_{a,raw}$ and the dimension of the radial air gap $s_{r,raw}$ can be registered with high reliability on the basis of the amplitudes of the sensor signals. The absolute torsion angle φ of the transmission shaft 2 may also be determined with high reliability to ascertain the corrected air gaps $s_a$, $s_r$. An excessively large change of the absolute torsion angle φ as a result of an undesired vehicle movement is detected and results in an error reaction, for example, due to shut down of the drive system. The alternating drive torque can also be used to determine, before the starting of the vehicle, the absolute torsion angle φ of the rotor of an electrical machine unambiguously and with high reliability. A further rotor position encoder can thus be omitted or a redundancy of the rotor position registration is created for safety reasons.

Figure 3:
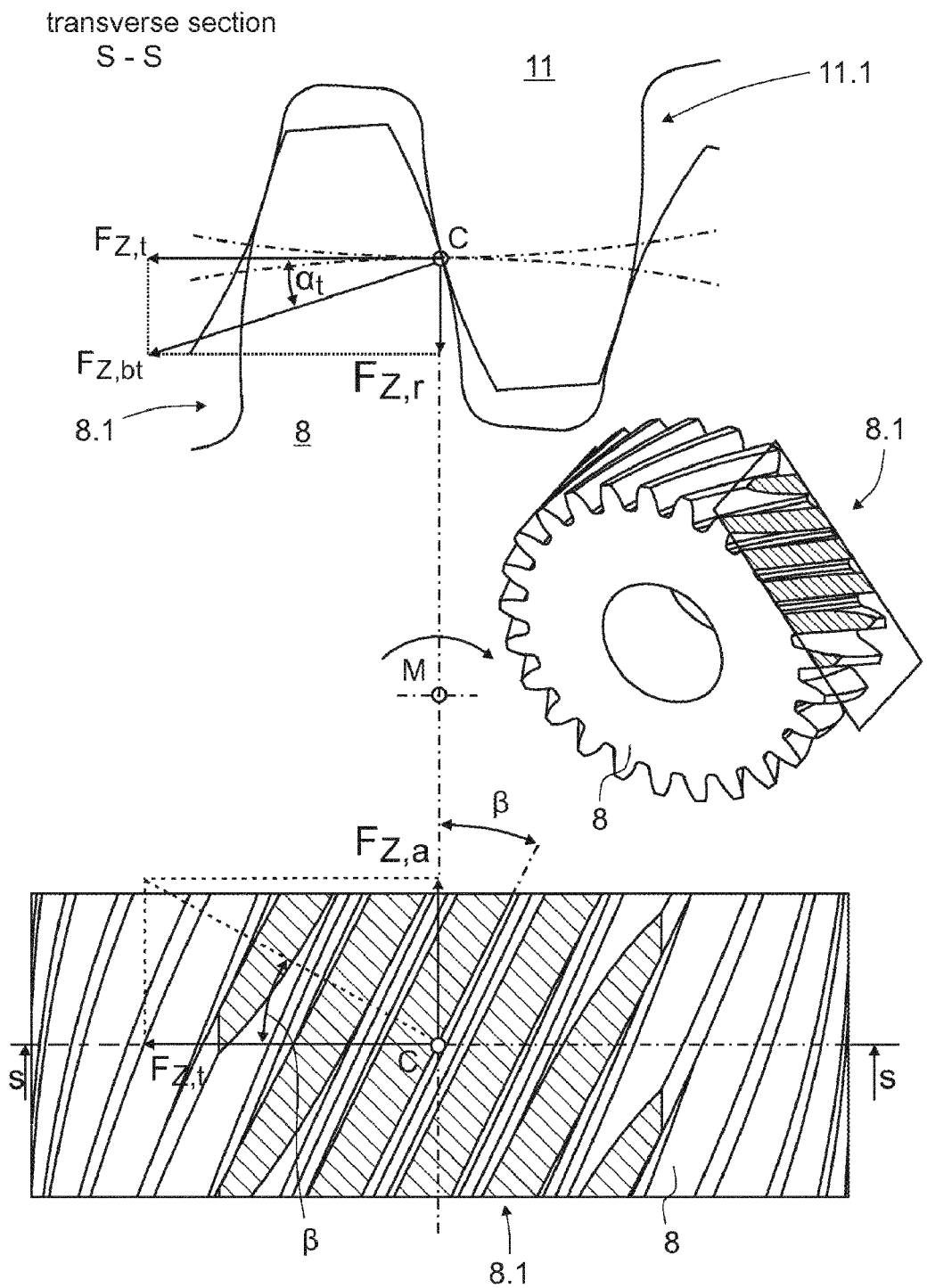
FIG. 3 shows schematic views of gear tooth geometries of a gearwheel.

Gearwheel transmissions are usually provided with involute gear teeth. In FIG. 3, the helical toothed gearwheel 8 having a corresponding gear tooth geometry 8.1 is shown. A rolling point is provided with the reference sign C. Of course, other gear tooth geometries (not shown) are also possible. In FIG. 3, a second gearwheel is provided with the reference sign 11 and its gear tooth geometry with the reference sign 11.1. A drive torque M results in the tooth normal force $F_{Z,bt}$ in the transverse section or in a tooth tangential force $F_{Z,t}$ (see FIG. 3). With the pitch circle diameter $d_w$ (not shown) and the angle of engagement $\alpha_t$, the following applies if the friction is neglected:

$$F_{Z,t} = M \cdot \frac{2}{d_w} \quad (3)$$

$$F_{Z,bt} = F_{Z,t} \cdot \frac{1}{\cos\alpha_t} = M \cdot \frac{2}{d_w \cdot \cos\alpha_t} \quad (4)$$

With helical gear teeth, as a result of an angle of inclination β, a tooth axial force $F_{Z,a}$, which is absorbed by the bearing, additionally results:

$$F_{Z,a} = F_{Z,t} \cdot \tan\beta = M \cdot \frac{2 \cdot \tan\beta}{d_w} \quad (5)$$

Figure 4:
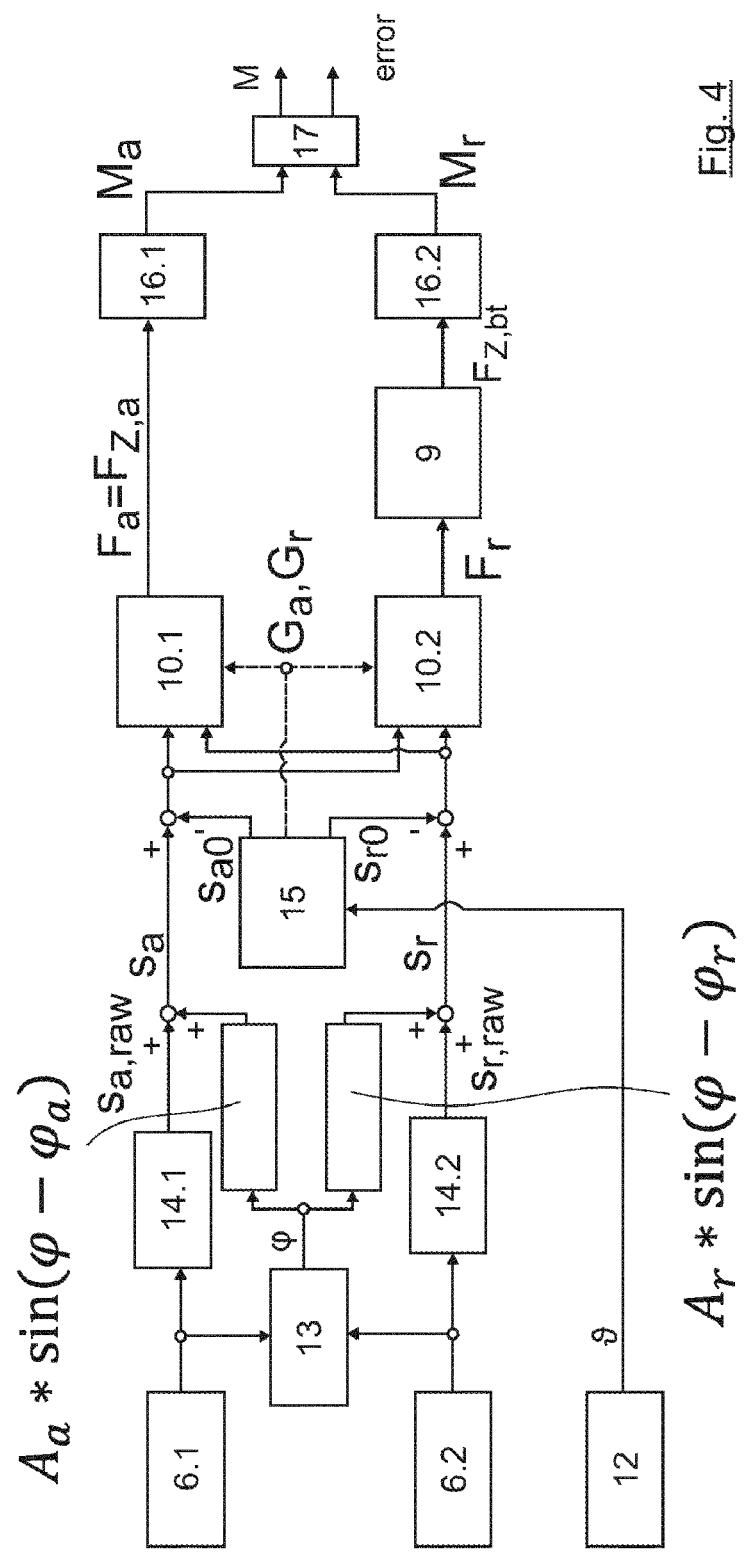
FIG. 4 shows a schematic block diagram to illustrate the method according to the invention.

The tooth normal force $F_{Z,bt}$ in transverse section S-S may be determined via equilibrium conditions 9 of the transmission shaft 2 from a radial bearing force $F_r$ (see FIG. 4). The bearing or roller bearing 1 observed in the present exemplary embodiment is a fixed bearing of a fixed-floating bearing arrangement and thus absorbs the entire axial force. The tooth axial force $F_{Z,a}$ therefore corresponds to an axial bearing force $F_a$. The axial bearing force $F_a$ and the radial bearing force $F_r$ are ascertained on the basis of bearing models 10.1, 10.2 from the current axial air gap $s_a$, the radial air gap $s_r$, the current center positions $s_{a0}$, $s_{r0}$, and the current axial play $G_a$ or radial play $G_r$ (see FIG. 4).

Two torque values $M_a$ and $M_r$ for the same drive torque M can be ascertained via two relationships:

The torque value $M_a$ can be ascertained on the basis of the axial bearing force $F_a$, which is predominantly dependent on the axial air gap $s_a$, using equation (5).

The torque value $M_r$ can be ascertained on the basis of the radial bearing force $F_r$, which is predominantly dependent on the radial air gap $s_r$, using equation (4). For this purpose, with the aid of the equilibrium conditions 9 of the transmission shaft 2, first the tooth normal force $F_{Z,bt}$ in transverse section S-S is ascertained from the radial bearing force $F_r$.

The relationships can additionally be expanded by mass forces as a result of accelerations (for example, driving shocks due to potholes), wherein the accelerations are measured or ascertained or observed on the basis of other variables. As a result, a current operating bearing play and/or mass forces as a result of accelerations are taken into consideration in the determination of the forces, which act between the first bearing ring 3 and the second bearing ring 5 and/or the torques, the effects of which induce the forces.

It can be provided that the resulting drive torque M is determined by weighted averaging dependent on the operating state of the torque values $M_a$ and $M_r$ and the deviation of the torque values $M_a$ and $M_r$ from one another is ascertained. The first value of a torque $M_a$, which acts on the roller bearing 1, is thus formed from the axial bearing force $F_a$ and the second value of the torque $M_r$ is formed from the radial bearing force $F_r$, wherein the axial bearing force $F_a$ and the radial bearing force $F_r$ are absorbed by the roller bearing 1 and induced by the torque M.

The axial bearing force $F_a$ can be formed on the basis of the bearing model 10.1 essentially or completely from the value characterizing the distance between the magnetic sensor 6.1 and the corresponding standard (not shown) of the second bearing ring 5 in the axial spatial direction or the axial air gap $s_a$.

The radial bearing force $F_r$ can be formed on the basis of the bearing model 10.2 essentially or completely from the value characterizing the distance between the magnetic sensor 6.2 and the corresponding standard (not shown) of the second bearing ring 5 in the radial spatial direction or the radial air gap $s_r$.

In particular for error detection, a deviation between the first torque value $M_a$ and the second torque value $M_r$ can be determined. An error can be recognized if the deviation between the first torque value $M_a$ and the second torque value $M_r$ is above a predefined threshold value, preferably dependent on the operating state.

In the event of an excessively large deviation (greater than a threshold dependent on the operating state), an error in the sensor system, the evaluation, or the bearing is concluded and a shutdown of the drive system or an operation at reduced power is initiated. With the aid of this redundancy, errors in the determination of the drive torque M are reliably recognized, linked to a high level of safety. Errors in the bearing may also be recognized, for example, a disturbed floating bearing function, in which the floating bearing inadvertently absorbs axial forces. This procedure is cost-effective, since measurement on both bearings is avoided. In further applications (not shown), the bearing forces are influenced by further external forces, for example, by weight forces or the magnetic forces of an electrical machine. The axial bearing force $F_a$ can include, for example, an additional external thrust of a propeller or fan. It can therefore be advantageous to ascertain corresponding forces and take them into consideration, for example, in the conversion of the axial bearing force $F_a$ into the tooth axial force $F_{Z,a}$. The thrust of a fan may be estimated for this purpose based on the current speed. In the case of multiple gear wheels on one shaft, all tooth forces are to be taken into consideration.

The method according to the invention can be used in a vehicle, in particular having an electrified drive arrangement, wherein the roller bearing 1 is a part of the drive arrangement and the transmission shaft 2 of the drive arrangement accommodates the second bearing ring 5 and wherein a resulting drive torque M is determined by averaging, in particular weighted depending on the operating state, of the first and the second torque value $M_a$, $M_r$.

FIG. 4 gives an overview of the entire method according to the invention in the form of a block diagram or signal flow diagram.

The functional unit 13 has a Nonius evaluation, which determines the absolute torsion angle φ of the transmission shaft 2. The functional blocks 14.1 and 14.2 comprise the amplitude evaluations for the output signals of the magnetic sensors 6.1, 6.2. The ascertainment of the operating bearing play is carried out in a functional unit 15. A temperature sensor is provided with the reference sign 12 in FIG. 4. The bearing models 10.1, 10.2 receive as input variables the corrected values of the axial air gap $s_a$ and the radial air gap $s_r$, modified by the center positions $s_{a0}$, $s_{r0}$ and the ascertained values of the axial play $G_a$ and the radial play $G_r$. Output variables of the bearing models 10.1, 10.2 are the axial bearing force $F_a$ and the radial bearing force $F_r$. The bearing models 10.1, 10.2 contain a nonlinear, coupled rigidity characteristic. A coupling of the degrees of freedom is thus taken into consideration. For example, in a deep groove ball bearing, a change of the axial shift $\delta_a$ typically also has an effect on the radial bearing force $F_r$. The radial shift $\delta_r$ likewise also influences the axial bearing force $F_a$. The bearing models 10.1, 10.2 can be based on the calculation of the load distribution, in which the radii for the calculation of the Hertzian stress and the operating bearing play are incorporated. The operating bearing play is in turn influenced by the bearing clearance class of the bearing or roller bearing 1, the fits on the bearing seats for roller bearing inner ring and roller bearing outer ring, wear, and thermal expansions and determined accordingly. The bearing models 10.1, 10.2 may be described, for example, by bearing stiffness characteristic maps. In an expansion, the bearing models 10.1, 10.2 take into consideration the current speed, since centrifugal forces change the bearing kinematics at high speed.

The functional units 16.1 and 16.2 comprise gear tooth models and the relationships of equations (4) and (5). From the ascertained axial bearing force $F_a$, the tooth axial force $F_{Z,a}$ is ascertained and with the aid of equation (5), a first torque value $M_a$ for the resulting drive torque M is ascertained. From the ascertained radial bearing force $F_r$, with the aid of the equilibrium conditions 9 of the transmission shaft 2, first the tooth normal force $F_{Z,bt}$ in transverse section S-S is ascertained and, using equation (4), then a second torque value $M_r$ for the resulting drive torque M is ascertained.

In a functional unit 17, averaging is carried out between the torque values $M_a$, $M_r$ and an error detection if the deviation between the first torque value $M_a$ and the second torque value $M_r$ is above a predefined threshold value.

Upon the sign change of the resulting drive torque M, the orientation of the tooth axial force $F_{Z,a}$ changes, with the line of action remaining the same, due to which the sign change of the drive torque M is unambiguously recognized. The tooth normal force $F_{Z,bt}$ in transverse section S-S assumes a different line of action due to the change from the tooth front flank to the tooth rear flank, as a result of which the angle between this line of action and the radial direction pre- defined by pole ring 7 and magnetic sensor 6.2 also changes. This effect is taken into consideration in the ascertainment of the second torque value $M_r$. The different behavior of the tooth axial force $F_{Z,a}$ and the tooth normal force $F_{Z,bt}$ in transverse section S-S is thus used to increase the reliability of the error detection.

In another embodiment of the invention, further external forces are determined, which act on the second bearing ring 5, such as magnetic forces of an electrical machine or forces of a propeller or fan. For example, the thrust of a propeller acts as a further external axial force $F_{Ext,a}$ in addition to the tooth axial force $F_{Z,a}$ on the axial bearing force $F_a$:

$$F_a = F_{Z,a} + F_{Ext,a} \quad (6)$$

According to FIG. 4, in this example, from the ascertained radial bearing force $F_r$, a second torque value $M_r$ for the resulting drive torque M is also ascertained. If inaccuracies are neglected, this second torque value $M_r$ corresponds to the first torque value $M_a$, since both values characterize the same resulting drive torque M:

$$M_a = M_r \quad (7)$$

From the first torque value $M_a$, the tooth axial force $F_{Z,a}$ is then calculated with the aid of equation (5). Therefrom and from the axial bearing force $F_a$ ascertained by means of bearing model 10.1, with the aid of equation (6), the external axial force $F_{Ext,a}$ (thrust of the propeller) is determined. A corresponding procedure is possible to determine external radial forces, for example, radial processing forces on a roll in the rolling mill.

The method according to the invention can be executed on an electronic control unit (not shown), which is connected to the magnetic sensors 6.1, 6.2 and the temperature sensor 12 and receives their output signals as input signals.

| | List of reference signs |
|---|---|
| 1 | roller bearing |
| 2 | transmission shaft |
| 3 | first bearing (outer) ring |
| 4 | sensor housing |
| 5 | second bearing (inner) ring |
| 6.1 | magnetic sensor (axial) |
| 6.2 | magnetic sensor (radial) |
| 7 | pole ring |
| 8 | helical-toothed gearwheel |
| 8.1 | gear tooth geometry |
| 9 | equilibrium conditions |
| 10.1 | bearing model |
| 10.2 | bearing model |
| 11 | second gearwheel |
| 11.1 | gear tooth geometry |
| 12 | temperature sensor |
| 13 | functional unit Nonius evaluation |
| 14.1 | functional unit amplitude evaluation |
| 14.2 | functional unit amplitude evaluation |
| 15 | functional unit for ascertaining the operating bearing play |
| 16.1 | functional unit gear tooth model |
| 16.2 | functional unit gear tooth model |
| 17 | functional unit for averaging and error detection |
| φ | absolute torsion angle |
| $s_r$ | radial air gap |
| $s_a$ | axial air gap |
| t | time |
| $T_1$ | point in time |
| $T_2$ | point in time |
| $s_{a0}$ | center position of the axial air gap |
| $s_{r0}$ | center position of the radial air gap |
| $G_a$ | axial play |
| $G_r$ | radial play |
| ϑ | bearing temperature |

-continued

List of reference signs

| | |
|---|---|
| M | drive torque |
| $M_a$ | torque value |
| $M_r$ | torque value |
| $\delta_a$ | axial shift |
| $\delta_r$ | radial shift |
| $\psi$ | tilt |
| $F_{Z,a}$ | tooth axial force |
| $F_{Z,bt}$ | tooth normal force |
| $F_{Z,r}$ | tooth radial force |
| $F_{Z,t}$ | tooth tangential force |
| $\beta$ | angle of inclination |
| $\alpha_t$ | angle of engagement |
| $F_a$ | axial bearing force |
| $F_r$ | radial bearing force |
| $s_{a,raw}$ | raw value of the axial air gap |
| $s_{r,raw}$ | raw value of the radial air gap |
| C | rolling point |

What is claimed is:

1. A method for determining shifts in position in at least two different spatial directions between a first bearing ring and a second bearing ring of a roller bearing, with the first bearing ring being fixed and the second bearing ring being rotatable relative to the fixed bearing ring about a longitudinal axis, and the roller bearing having at least two contactlessly measuring sensors, which are arranged spaced apart in the at least two different spatial directions from at least two standards fixedly connected to the second bearing ring, wherein sensor surfaces of the at least two sensors are opposite to the at least two standards in the respective spatial direction and register them, wherein:
the at least two sensors scan the at least two standards and generate output signals in interaction with the at least two standards, using which in combination an absolute position of the second bearing ring is determined, which is connected to a rotational movement, and
wherein furthermore by means of the output signals of the at least two sensors, values are determined which characterize the distance between the respective sensor and the corresponding standard of the second bearing ring in the associated spatial direction, which are corrected as a function of the ascertained absolute position of the second bearing ring, and from which the shift in position of the second bearing ring relative to the first bearing ring in the respective spatial direction is determined.

2. The method as claimed in claim 1, wherein the values characterizing the distance between the respective sensor and the corresponding standard of the second bearing ring in the associated spatial direction are determined by an amplitude of the output signal of the respective sensor.

3. The method as claimed in claim 1, wherein the at least two standards are designed in such a way that, in combination with one another, they form means for determining the absolute position of the second bearing ring.

4. The method as claimed in claim 1, wherein the at least two standards, in combination with one another, form a binary pattern, a gray pattern, a pseudorandom code, in particular having an additional incremental track for fine interpolation, or a Nonius track.

5. The method as claimed in claim 1, wherein the at least two sensors are connected to the first bearing ring and/or to a fixed structure.

6. The method as claimed in claim 1, wherein forces and/or torques which act between the first bearing ring and the second bearing ring are determined from the ascertained shifts in position of the second bearing ring relative to the first bearing ring.

7. The method as claimed in claim 1, wherein redundant values of torques, the effects of which induce the shifts in position, or further external forces, which act on the second bearing ring, are ascertained in each case from the ascertained shifts in position of the second bearing ring relative to the first bearing ring in the at least two different spatial directions.

8. The method as claimed in claim 7, wherein a resulting torque is formed, in particular by preferably weighted averaging, from the redundantly ascertained torque values.

9. The method as claimed in claim 1, wherein an absolute torsion angle of the second bearing ring is used as the ascertained absolute position of the second bearing ring.

10. The method as claimed in claim 1, wherein a radial direction is used as a first spatial direction of the at least two different spatial directions and an axial direction in relation to the longitudinal axis of the second bearing ring is used as a second spatial direction of the at least two different spatial directions.

11. The method as claimed in claim 1, wherein a current operating bearing play and/or mass forces as a result of accelerations are taken into consideration in the determination of the forces which act between the first bearing ring and the second bearing ring and/or the torques, the effects of which induce the forces.

12. The method as claimed in claim 1, wherein a first value of a torque, which acts on the roller bearing, is formed from an axial bearing force, and a second value of the torque is formed from a radial bearing force, wherein the axial bearing force and the radial bearing force are absorbed by the roller bearing and induced by the torque.

13. The method as claimed in claim 12, wherein the axial bearing force is formed on the basis of a bearing model from a value characterizing the distance between an axial sensor of the at least two sensors and the corresponding standard of the second bearing ring in the axial spatial direction.

14. The method as claimed in claim 12, wherein the radial bearing force is formed on the basis of a bearing model from a value characterizing the distance between a radial sensor and the corresponding standard of the second bearing ring in the radial spatial direction.

15. The method as claimed in claim 12, wherein, in particular for error detection, a deviation is determined between the first and the second torque value.

16. The method as claimed in claim 15, wherein an error is recognized if the deviation between the first and the second torque value is above a predefined threshold value preferably dependent on the operating state.

17. The method as claimed in claim 12, which is used in a vehicle, in particular having an electrified drive arrangement, wherein the roller bearing is a part of the drive arrangement and a transmission shaft of the drive arrangement accommodates the second bearing ring, and wherein a resulting drive torque is determined by weighted averaging, in particular dependent on the operating state, of the first and second torque value.

18. The method as claimed in claim 1, wherein at least one of the sensors is embodied as a magnetic sensor.

19. The method as claimed in claim 1, wherein at least one of the standards is formed as a multipolar magnetic ring, which circumferentially has alternating magnetic regions.

20. A system for determining shifts in position in at least two different spatial directions between a first bearing ring and a second bearing ring of a roller bearing, with the first bearing ring being fixed and the second bearing ring being rotatable relative to the fixed bearing ring about a longitudinal axis, and the roller bearing having at least two contactlessly measuring sensors, which are arranged spaced apart in the at least two different spatial directions from at least two standards fixedly connected to the second bearing ring, wherein sensor surfaces of the at least two sensors are opposite to the at least two standards in the respective spatial direction and register them, wherein the at least two standards are designed in such a way that in combination with one another, they form means for determining the absolute position of the second bearing ring, wherein:

- the at least two sensors are configured to scan the at least two standards and generate output signals in interaction with the at least two standards, using which in combination an absolute position of the second bearing ring is determinable, and wherein
- an electronic control unit is provided, which has a communication connection to the at least two sensors, which receives their output signals as input signals, and which is configured to carry out a method as claimed in claim 1.

\* \* \* \* \*